(12) United States Patent
Targowski (10) Patent No.: US 9,652,300 B2
(45) Date of Patent: May 16, 2017

(54) SYSTEMS, METHODS, AND COMPUTER PROGRAM PRODUCTS FOR PREEMPTION OF THREADS AT A SYNCHRONIZATION BARRIER

(75) Inventor: Marek Targowski, Gdynia (PL)

(73) Assignee: Intel Corporation, Santa Clara, CA (US)

(*) Notice: Subject to any disclaimer, the term of this patent is extended or adjusted under 35 U.S.C. 154(b) by 937 days.

(21) Appl. No.: 13/535,976

(22) Filed: Jun. 28, 2012

(65) Prior Publication Data

US 2014/0007111 A1    Jan. 2, 2014

(51) Int. Cl.
| G06F 9/46 | (2006.01) |
| G06F 9/52 | (2006.01) |
| G06F 9/50 | (2006.01) |
| G06F 9/38 | (2006.01) |

(52) U.S. Cl.
CPC ............ *G06F 9/522* (2013.01); *G06F 9/505* (2013.01); *G06F 9/3851* (2013.01)

(58) Field of Classification Search
CPC ......... G06F 9/522; G06F 9/505; G06F 9/3851
See application file for complete search history.

(56) References Cited

U.S. PATENT DOCUMENTS

| 5,448,732 | A  * | 9/1995  | Matsumoto ............... 718/104 |
| 6,466,988 | B1 * | 10/2002 | Sukegawa et al. ......... 709/248 |
| 7,512,950 | B1 * | 3/2009  | Marejka .................... 718/106 |
| 7,788,468 | B1 * | 8/2010  | Nickolls et al. ............. 712/22 |
| 2006/0085679 | A1 * | 4/2006 | Neary et al. ................. 714/13 |
| 2010/0100706 | A1 * | 4/2010 | Inoue ................. G06F 9/5077 712/30 |
| 2011/0078417 | A1 * | 3/2011 | Fahs et al. .................. 712/216 |
| 2011/0087860 | A1 * | 4/2011 | Nickolls et al. ............. 712/22 |
| 2011/0302586 | A1 * | 12/2011 | Chung ...................... 718/103 |
| 2012/0233486 | A1 * | 9/2012  | Phull et al. ................. 713/375 |

* cited by examiner

*Primary Examiner* — Lewis A Bullock, Jr.
*Assistant Examiner* — Kevin X Lu
(74) *Attorney, Agent, or Firm* — Garrett IP, LLC (57) ABSTRACT

Systems and methods for the processing of EU threads (also known as warps) in a thread group. The status of each EU thread in the group may be monitored, to determine if it is executing or if it is halted and waiting at a synchronization barrier. If certain threshold conditions are met, the waiting EU threads may be preempted to allow execution of threads from another thread group. The threshold conditions may include a minimum number of EUs in use, a minimum number of EU threads in the first thread group that are waiting at the synchronization barrier and/or a maximum number of EU threads that are still executing, and a minimum wait time for one or more of the EU threads waiting at the barrier.

20 Claims, 8 Drawing Sheets

SYSTEMS, METHODS, AND COMPUTER PROGRAM PRODUCTS FOR PREEMPTION OF THREADS AT A SYNCHRONIZATION BARRIER

BACKGROUND

In the processing of single instructions that operate on multiple data elements (SIMD), it is common to execute such instructions as multiple logical threads in a single execution unit (EU) thread. Multiple EU threads may be organized in a thread group. Some developers refer to an EU thread as a warp. SIMD operations are often used in graphics processing, e.g., in shaders and other applications.

A graphics processing unit (GPU) may consist of a number of execution units (EUs), each of which is a processing core. In general every EU runs some number of EU threads such that these EU threads appear to be running in parallel. In fact only a limited number of EU threads is running on an EU at any given time, and sometimes just one EU thread. An EU thread running on an EU may be pre-empted by another EU thread for the sake of efficiency. For example, an EU thread may access memory and wait for the operation's completion. In such a case, another EU thread assigned to this EU may be taken from the queue and continue its execution. Because of this, the GPU may be more efficiently utilized in comparison to a system having sequentially running EU threads from the beginning to the end on a given EU. Generally, EU threads may be given access to an EU in a round-robin mode, for example.

An EU thread represents a single instruction with multiple data elements (SIMD). A single EU thread may run a number of logical threads (e.g., 16, 32, or 64, depending on the processor or system vendor). For example, consider a program that performs the multiplication x*x. There are 3 instructions:
Load x
Multiply y=x*x
Store y The first logical thread would consist of these three instructions, where x=1. Likewise, the second logical thread has x=2, the third has x=3, and so on. Assume that the EU thread works in "SIMD 8" mode (executing eight logical threads in parallel). Then the EU thread performs only these three instructions to calculate multiplications for eight numbers. In operation, the following actions take place:
Load 1, 2, 3, 4, 5, 6, 7, 8 (in the eight respective logical threads, in parallel)
Multiply 1*1, 2*2, 3*3, 4*4, 5*5, 6*6, 7*7, 8*8 (respectively, in parallel)
Store 1, 4, 9, 16, 25, 36, 49, 64 (respectively, in parallel)

This multiplication for all eight input numbers is performed at once (e.g., in one clock cycle). The hardware performs this single (the same) arithmetic operation on multiple data elements in parallel.

Synchronization may be a problem in some situations, however, given that different EU threads may take different amounts of time to complete for more complex operations. This issue is often addressed through the use of a synchronization barrier. Here, each EU thread in a thread group halts when a certain point is reached. Once all EU threads have reached this point, then the thread group may continue. This prevents error conditions that would occur in situations where, for example, one or more EU threads may require the results of another EU thread.

Given the use of synchronization barriers, efficiency problems may occur, however. In some situations, several EU threads may have to wait at a synchronization barrier because they have reached the predefined stopping point, while another EU thread continues to execute. The still-executing EU thread may be processing a loop, for example, that requires an extended time to complete. The waiting EU threads have to remain idle, still occupying their respective execution units, and cannot proceed until the executing EU thread finishes. This may represent inefficient use of computing resources and may slow down an application.

BRIEF DESCRIPTION OF THE DRAWINGS/FIGURES

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

The systems and methods described herein relate to the processing of EU threads in a thread group. The status of each EU thread in the group may be monitored, to determine if it is executing or if it is halted and waiting at a synchronization barrier. If certain threshold conditions are met, the waiting EU threads may be preempted to allow execution of threads from another thread group. The threshold conditions may include a minimum number of EUs in use, a minimum number of EU threads in a thread group that are waiting at the synchronization barrier and/or a maximum number of EU threads that are still executing, and a minimum wait time for one or more of the EU threads waiting at the barrier.

Figure 1:
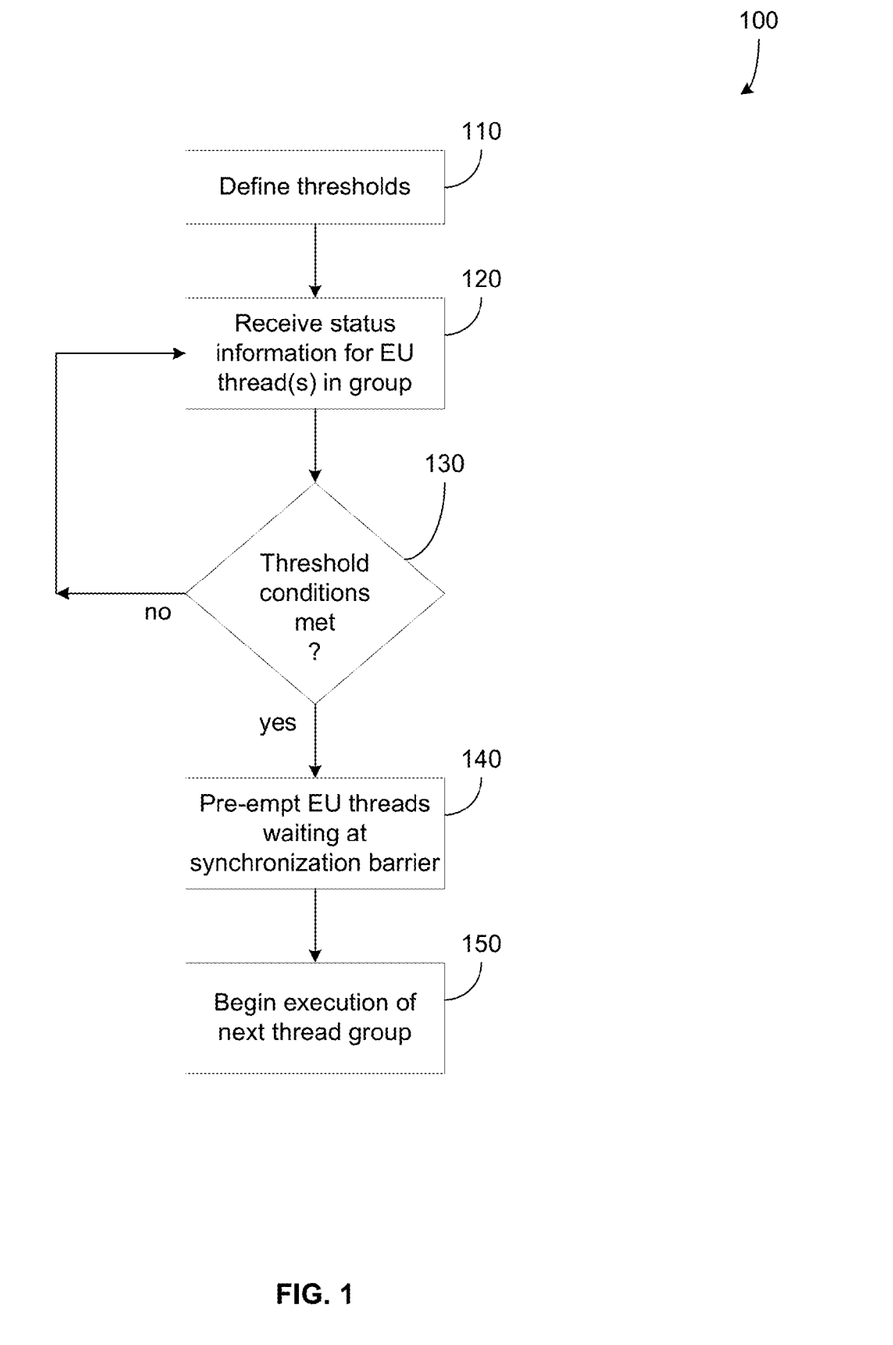
FIG. 1 is a flowchart illustrating the processing of the systems described herein, according to an embodiment.

Processing of the system described herein is illustrated in FIG. 1, according to an embodiment. At 110, a set of thresholds may be defined. These thresholds may represent the conditions under which EU threads of a first thread group may be preempted, such that the EUs occupied by the preempted threads may be made available for use by a second thread group. At 120, status information for one or more EU threads in the first thread group may be received. As will be described in greater detail below, this status information may be originated by logic in the EU thread or elsewhere in the program, and received by thread management hardware in the GPU or in communication with the GPU. The status information may include an indication of whether the EU thread has stopped at a synchronization barrier. At 130, a determination may be made as to whether the threshold conditions have been met, in view of the status information received at 120. If not, the process may wait for additional status information from another EU thread at 120.

Otherwise, processing may continue at 140. Here, given that the threshold conditions have been met, some or all of the EU threads waiting at the synchronization barrier may be preempted, freeing up the EUs that had been in use by these EU threads. At 150, EU threads of the next thread group may begin execution at these newly available EUs.

Figure 2:
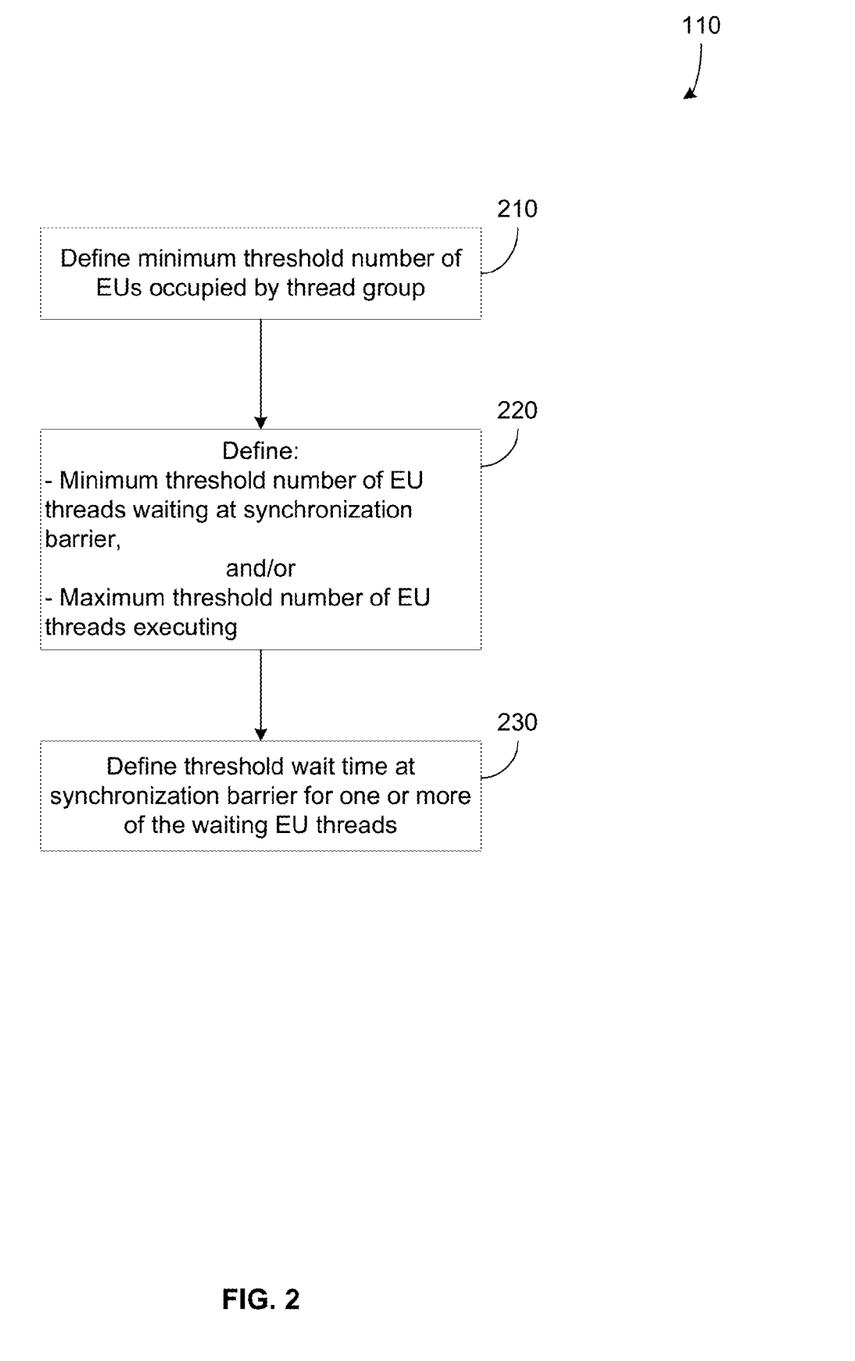
FIG. 2 is a flowchart illustrating the definition of threshold values, according to an embodiment.

The definition of threshold conditions (110 of FIG. 1) is illustrated in FIG. 2, according to an embodiment. At 210, a minimum number of EUs occupied by the original thread group may be defined. If all or most of the available EUs are currently in use by the thread group, this may suggest high demand for computing cores and the lack of availability of EUs for any other thread groups. If only a small proportion of EUs is in use by the first thread group, then preemption may not be necessary. Note that while this threshold may be defined as a specific number of EUs, in an alternative embodiment, this threshold may be defined as a minimum proportion of the total number of EUs.

At 220, a minimum threshold number of EU threads waiting at a synchronization barrier may be defined. Alternatively or in addition, a maximum threshold number of EU threads still executing (i.e., not waiting) may be defined. A large number of EU threads waiting at a synchronization barrier (and/or a small number of EU threads still executing) suggests that preemption may be desirable.

At 230, a minimum threshold waiting time at a synchronization barrier for one or more of the waiting EU threads may be defined. In an embodiment, thread management logic may receive an indication from the first EU thread in the group to reach the synchronization barrier. At this point, a timer may be started. If this EU thread has been waiting a sufficiently long time (as defined by this threshold value), and if the above additional threshold conditions are met, then preemption may be appropriate. In an alternative embodiment, the threshold waiting time may be defined as a function of the waiting times for one or more waiting EU threads, e.g. a mean or medium of the individual waiting times.

In alternative embodiments, additional threshold conditions may be defined and may have to be satisfied before preemption takes place. Alternatively, only some subset of the above specified conditions may be required before preemption takes place in other embodiments.

Moreover, the specific threshold values described above may be configurable. The definition of specific values may be determined by user, by scheduling logic, and/or may be defined dynamically according to operational conditions in the computing context of the thread group.

Figure 3:
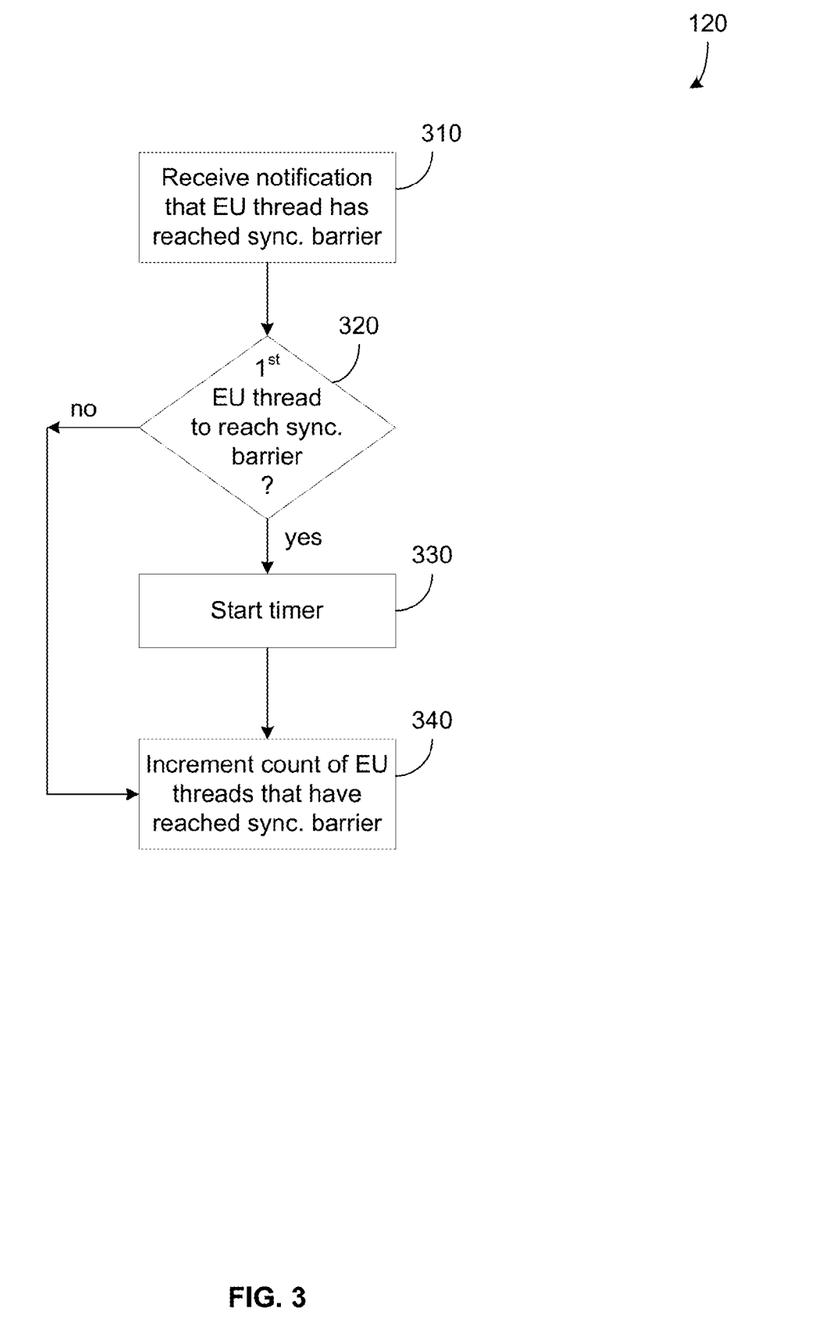
FIG. 3 is a flowchart illustrating the receiving and processing of status information from EU threads, according to an embodiment.

The receiving of status information (120 of FIG. 1) is illustrated in FIG. 3, according to an embodiment. At 310, thread management logic may receive a notification that an EU thread has reached the synchronization barrier. At 320, a determination may be made as to whether this is the first EU thread of its group to send such a notification. If so, then at 330, a timer may be started. At 340, a count of the number of EU threads that have reached the synchronization barrier may be incremented by one. If, at 320, it is determined that the notification received at 310 did not come from the first EU thread to reach the synchronization barrier, then the timer has been previously started, and the count of EU threads that have reached the synchronization barrier is incremented at 340. In this manner, the time elapsed since the first EU thread has reached the synchronization barrier is measured, while the number of EU threads that have reached the synchronization barrier is tracked. This may allow a determination of some of the threshold criteria described above, e.g., the number of EU threads to have reached the synchronization barrier, and the time elapsed since the first EU thread has reached this barrier.

Figure 4:
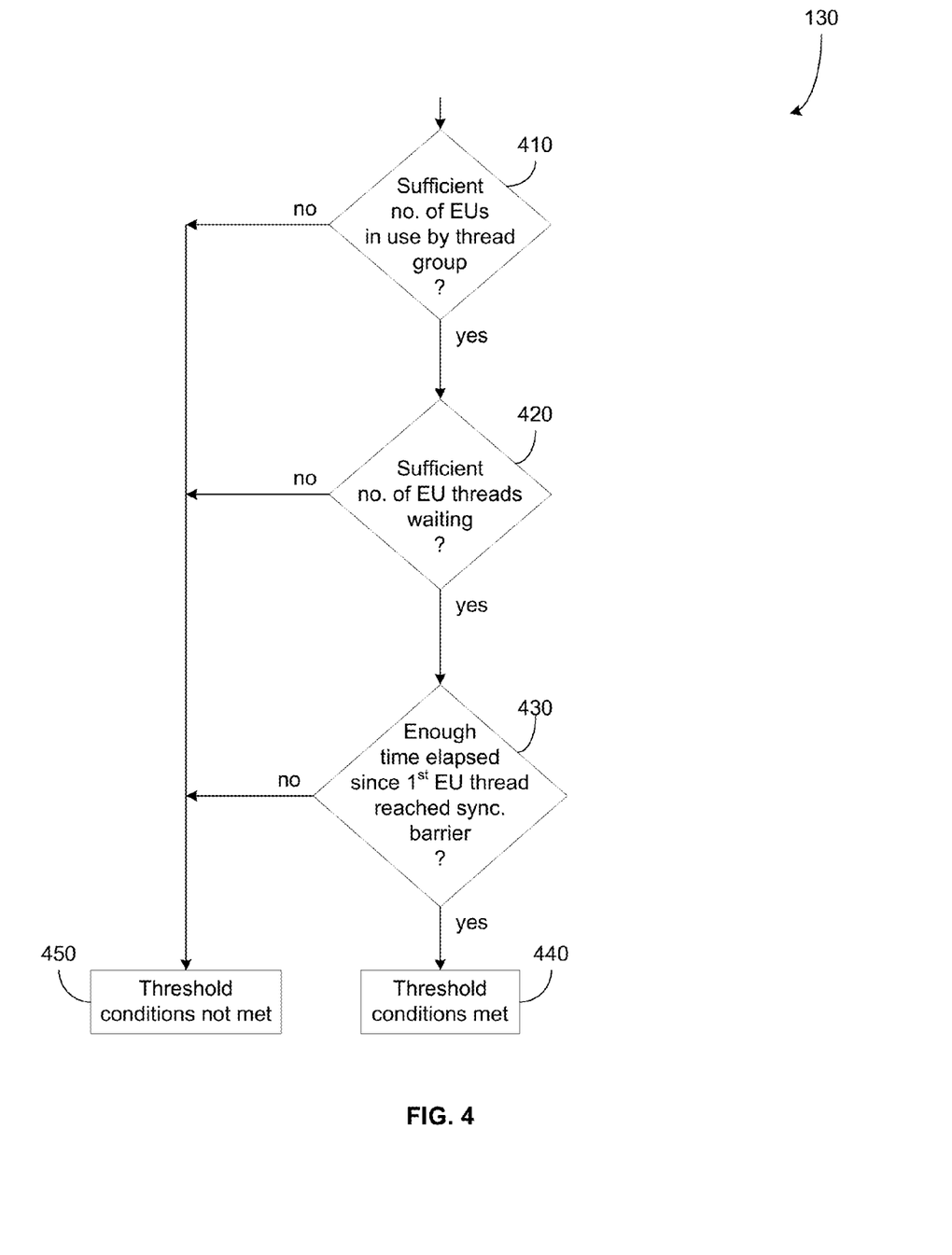
FIG. 4 is a flowchart illustrating the determination of whether threshold conditions are met, according to an embodiment.

The determination as to whether the threshold conditions are met is illustrated in greater detail in FIG. 4, according to an embodiment. At 410, a determination may be made as to whether a sufficient number of EUs are in use by the thread group. If so then that 420, a determination may be made as to whether a sufficient number of EU threads from the group are waiting at the synchronization barrier. If so, then at 430 determination may be made as to whether enough time has elapsed since the first EU thread from the thread group has reached the synchronization barrier. If so, then the threshold conditions have been met as shown at 440. If any of the conditions are not true, then the threshold conditions have not been met as shown at 450. As would be understood by a person of ordinary skill in the art, the determination is shown in this figure may be performed in any order in alternative embodiments.

Figure 5:
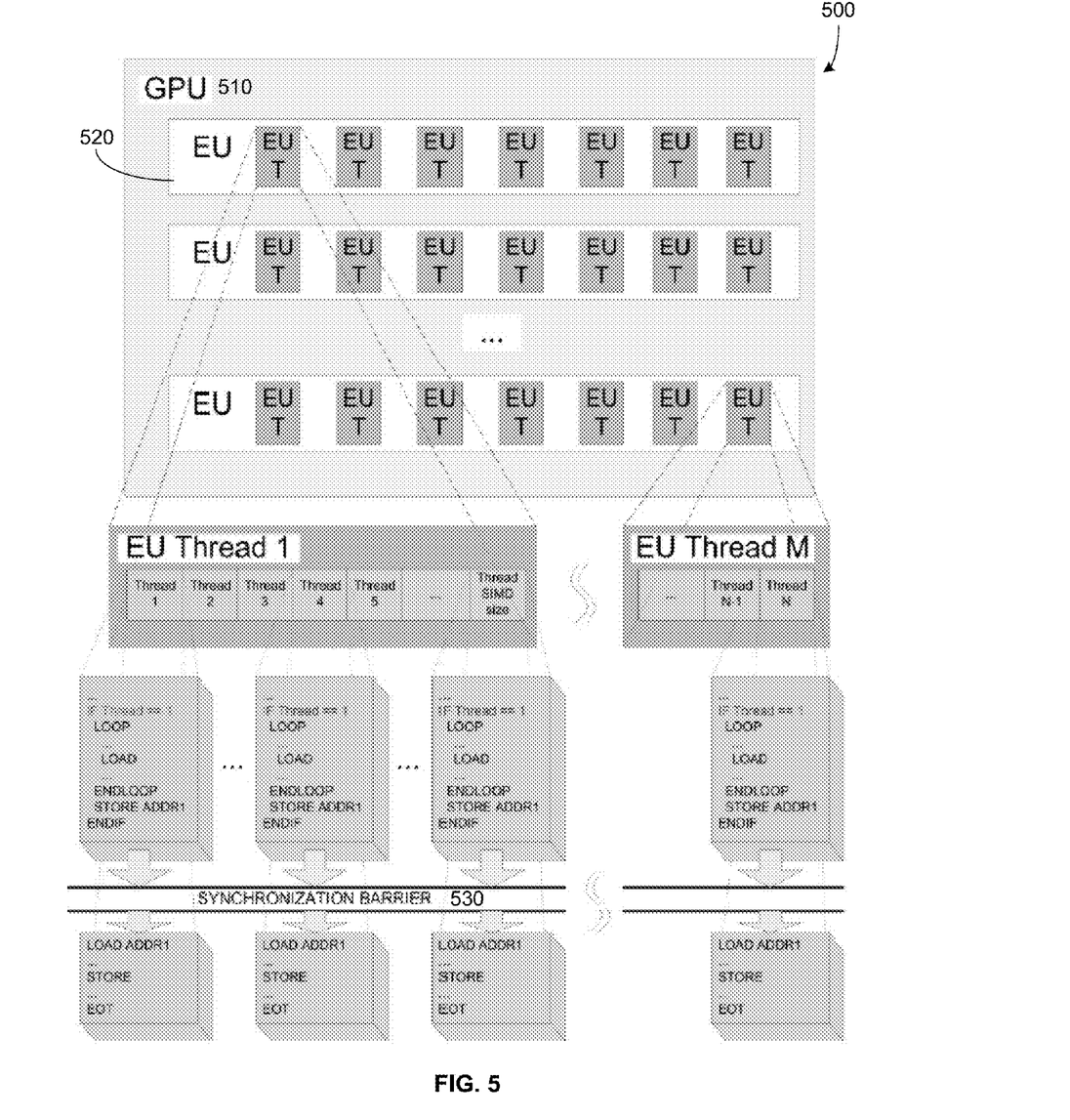
FIG. 5 is a diagram illustrating the processing of EU threads in a multi-core graphics processing unit, according to an embodiment.

FIG. 5 illustrates a graphics processing unit (GPU) 510 in which the systems and methods described herein may operate. The GPU 510 may include a number of EUs 520. On each EU 520, one or more EU threads may be executing, such as the illustrated EU thread 1. As discussed above, an EUT may include a number of logical threads (shown in EU thread 1 as "Thread 1", "Thread 2", etc.). In this illustration, EU thread 1 has reached a synchronization barrier 530. In addition, EU thread M is also shown as having reached the synchronization barrier 530. Normally, once all threads of a thread group have reached the synchronization barrier, the EU threads of the group may then continue executing. Here, the next instruction to be executed at this point for each logical thread is LOAD ADDR1.

As described above, by employing the system and method described above, EU threads that have reached the synchronization barrier 530 may be preempted if the defined threshold conditions are met. This would make EUs available for a next thread group.

Figure 6:
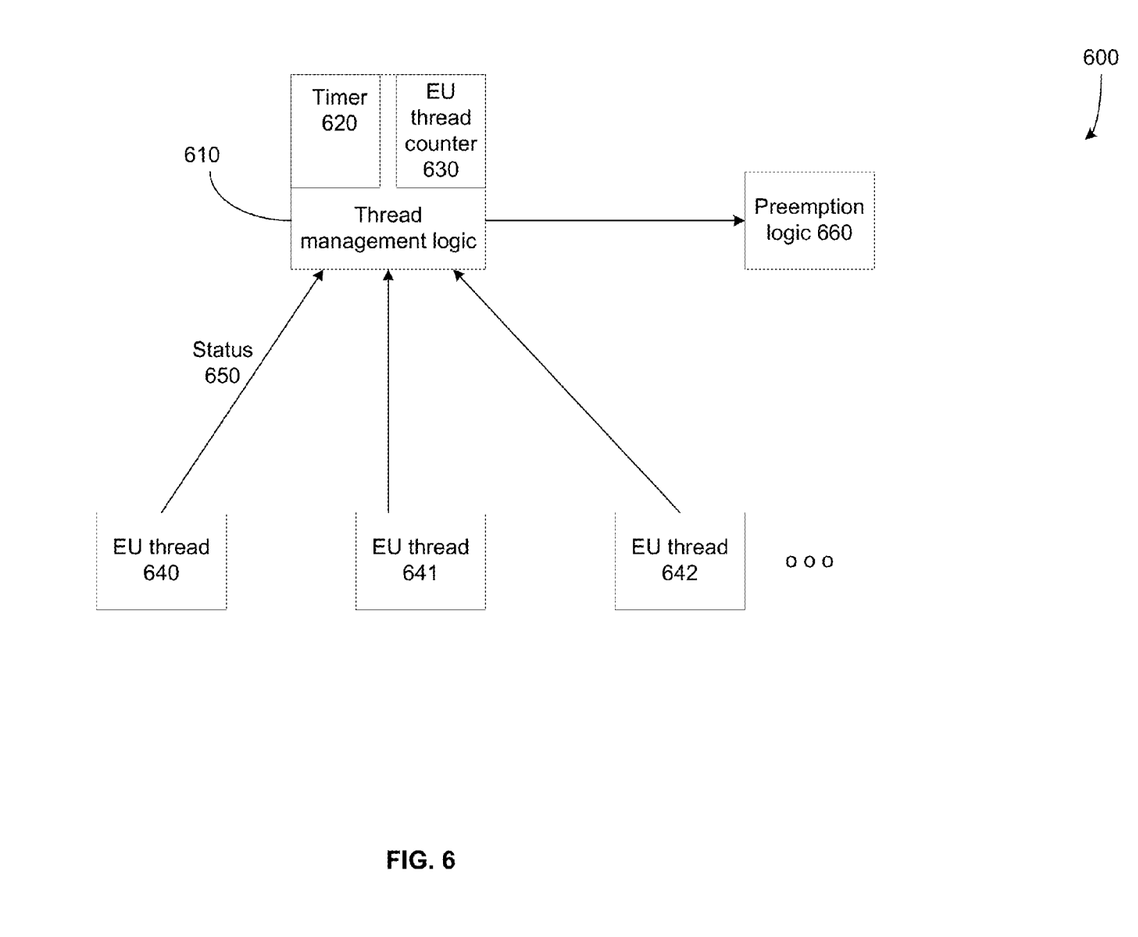
FIG. 6 is a block diagram illustrating the interaction of EU threads and thread management logic, according to an embodiment.

This is illustrated in FIG. 6, according to one embodiment. Thread management logic 610 may include a timer 620 and an EU thread counter 630. As EU threads 640, 641, 642 . . . etc. execute, one or more of these threads may send status information 650 to thread management logic 610. As discussed above, this status information 650 may include a notification that the EU thread has reached a synchronization barrier. In an embodiment, once such status information 650 is received from the first EU thread to have reached the synchronization barrier, timer 620 starts. Subsequent EU threads may also inform the thread management logic 610 when they reach the synchronization barrier. EU thread counter 630 may count the total number of EU threads that have reached the synchronization barrier. The value of the EU thread counter 630 and the timer 620 may be used to determine whether the threshold conditions have been met, as noted above. If the threshold conditions have been met, preemption logic 660 may be so informed, and the EU threads may be preempted in favor of EU threads from another thread group.

In an embodiment, thread management logic 610 and/or preemption logic 660 may be incorporated in the GPU or GPU cluster. Alternatively, one or more of these modules may be external to the GPU or cluster, and may be embodied in hardware, firmware, software, or some combination thereof.

Figure 7:
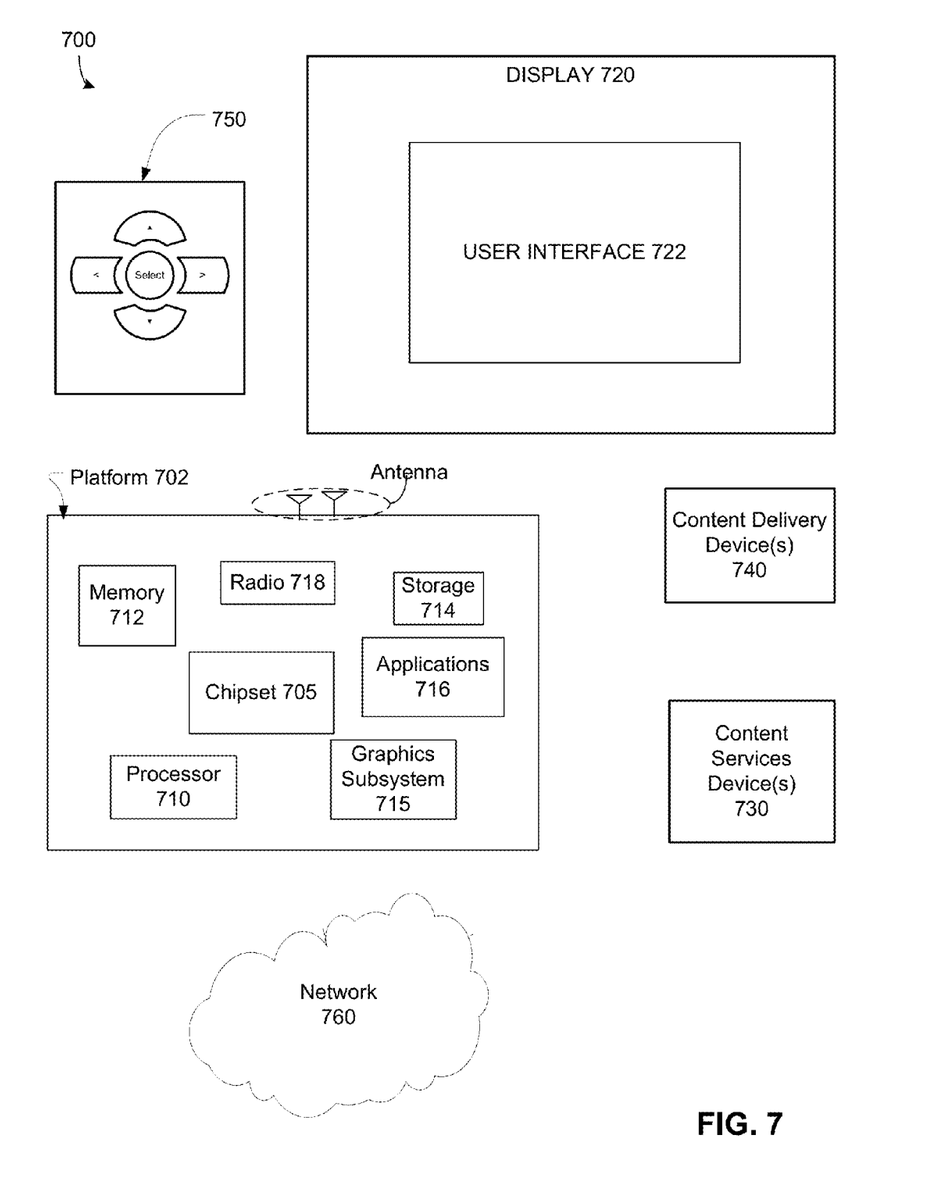
FIG. 7 is a block diagram illustrating an information system that may incorporate the system described below, according to an embodiment.

A system for processing EU threads in a thread group, such as the systems illustrated in FIGS. 5 and 6, may be a part of a larger information system. FIG. 7 illustrates such an embodiment, as a system 700. In embodiments, system 700 may be a media system although system 700 is not limited to this context. For example, system 700 may be incorporated into a personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display configured to display images such as graphics processed by the EUs discussed above. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off" In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
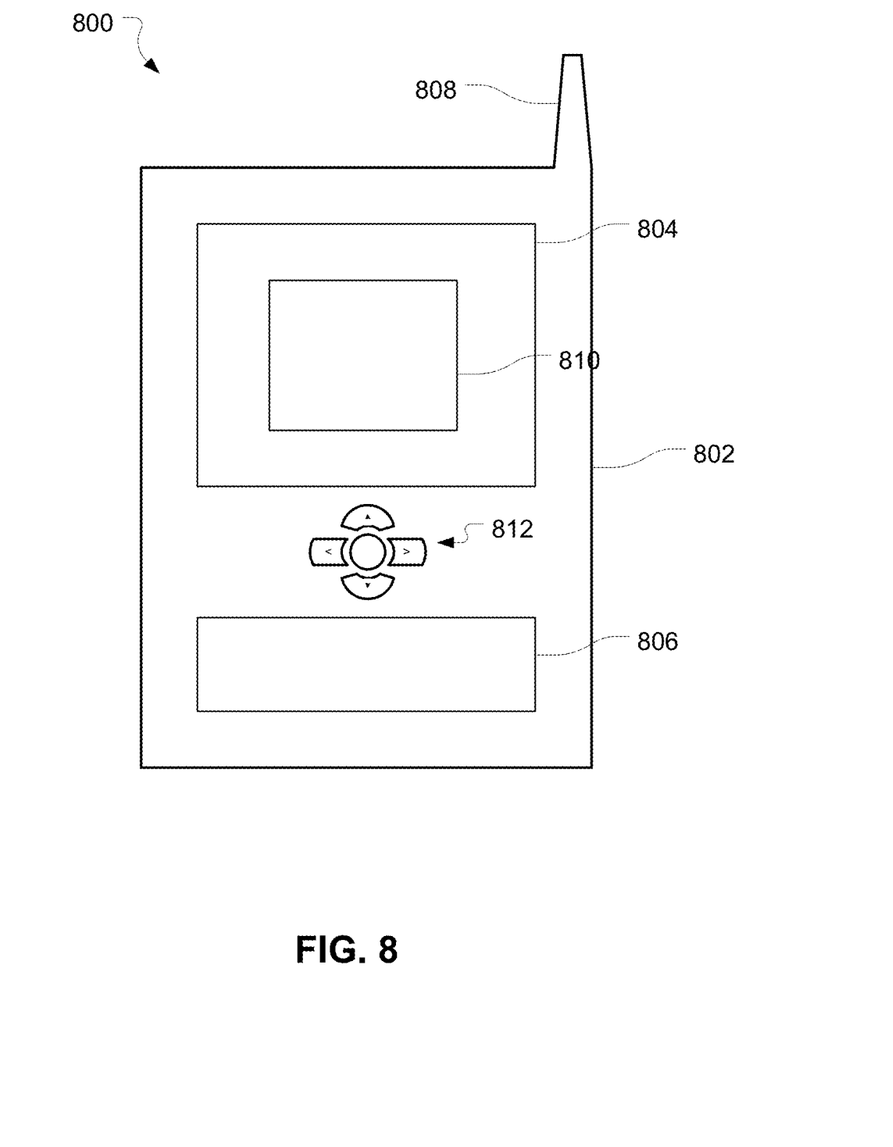
FIG. 8 illustrates a device that may incorporate the system described herein.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. Displayed information may include graphics processed by EUs. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The term software, as used herein, refers to a computer program product including at least one computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
   processing a first thread group over a set of single instruction multiple data (SIMD) execution units of a SIMD processor;
   idling threads of the first thread group as the respective threads reach a synchronization barrier; and
   selectively processing a second thread group on a first subset of the set of SIMD execution units for which threads of the first group are idled while one or more non-idle threads of the first thread group continue executing on a second subset of the set of SIMD execution units, based on a threshold related to one or more of demand for SIMD execution units of the SIMD processor and availability of the SIMD execution units of the SIMD processor;
   wherein the selectively processing includes,
      setting the threshold dynamically based on a context of the first thread group, and
      processing the second thread group on the first subset of the set of SIMD execution units if a difference between a number of SIMD execution units of the SIMD processor and a number of threads of the first thread group exceeds a minimum threshold difference.

2. The method of claim 1, wherein the selectively processing further includes:
   processing the second thread group on the first subset of the set of SIMD execution units if a number of threads of the first thread group exceeds a minimum threshold.

3. The method of claim 1, wherein the selectively processing further includes:
   processing the second thread group on the first subset of the subset of SIMD execution units if a number of non-idle threads of the first thread group exceeds a minimum threshold.

4. The method of claim 1, wherein the selectively processing further includes:
   processing the second thread group on the first subset of the set of SIMD execution units if a duration for which one or more threads of the first thread group is idle exceeds a minimum threshold duration.

5. The method of claim 4, wherein the selectively processing further includes:
   processing the second thread group on the first subset of the set of SIMD execution units if an average duration for which multiple threads of the first thread group are idle exceeds the minimum threshold duration.

6. The method of claim 1, wherein the selectively processing further includes one or more of:
   setting the threshold based further on user input; and
   setting the threshold with scheduling logic.

7. An apparatus, comprising, a single instruction multiple data (SIMD) processor and a thread manager, wherein the thread manager is configured to:
   assign a first thread group over a set of SIMD execution units of the SIMD processor;
   idle threads of the first thread group as the respective threads reach a synchronization barrier; and
   selectively assign a second thread group to a first subset of the set of SIMD execution units at which threads of the first group are idled while one or more non-idle threads of the first thread group continue executing on a second subset of the set of SIMD execution units, based on a threshold related to one or more of demand for SIMD execution units of the SIMD processor and availability of the SIMD execution units of the SIMD processor, including to,
set the threshold dynamically based on a context of the first thread group; and
process the second thread group on the first subset of the set of SIMD execution units if a difference between a number of SIMD execution units of the SIMD processor and a number of threads of the first thread group exceeds a minimum threshold difference.

8. The apparatus of claim 7, wherein the thread manager is further configured to:
assign the second thread group to the first subset of the set of SIMD execution units if a number of threads of the first thread group exceeds a minimum threshold.

9. The apparatus of claim 7, wherein the thread manager is further configured to:
assign the second thread group to the first subset of the set of SIMD execution units if a number of non-idle threads of the first thread group exceeds a minimum threshold.

10. The apparatus of claim 7, wherein the thread manager is further configured to:
assign the second thread group to the first subset of the set of SIMD execution units if a duration for which one or more threads of the first thread group is idle exceeds a minimum threshold duration.

11. The apparatus of claim 10, wherein the thread manager is further configured to:
assign the second thread group to the first subset of the set of SIMD execution units if an average duration for which multiple threads of the first thread group are idled exceeds the minimum threshold duration.

12. The apparatus of claim 7, wherein the thread manager is further configured to perform one or more of:
set the threshold based further on user input; and
set the threshold with scheduling logic.

13. The apparatus of claim 7, wherein the thread manager is further configured to determine when threads of the first thread group reach the synchronization barrier based on status information provided by the respective threads.

14. A non-transitory computer readable medium encoded with a computer program that includes instructions to cause a single instruction multiple data (SIMD) processor to:
process a first thread group over a set of SIMD execution units of the SIMD processor;
idle threads of the first thread group as the respective reach a synchronization barrier; and
selectively process a second thread group on a first subset of the set of SIMD execution units for which threads of the first group are idled while one or more non-idle threads of the first thread group continue executing on a second subset of the set of SIMD execution units, based on a threshold related to one or more of demand for SIMD execution units of the SIMD processor and availability of the SIMD execution units of the SIMD processor, including to,
set the threshold dynamically based on a context of the first thread group, and
process the second thread group on the first subset of the set of SIMD execution units if a difference between a number of SIMD execution units of the SIMD processor and a number of threads of the first thread group exceeds a minimum threshold difference.

15. The non-transitory computer readable medium of claim 14, further including instructions to cause the SIMD processor to:
process the second thread group on the first subset of the set of SIMD execution units a number of threads of the first thread group exceeds a minimum threshold.

16. The non-transitory computer readable medium of claim 14, further including instructions to cause the SIMD processor to:
process the second thread group on the first subset of the set of SIMD execution units if a number of non-idle threads of the first thread group exceeds a minimum threshold.

17. The non-transitory computer readable medium of claim 14, further including instructions to cause the SIMD processor to:
process the second thread group on the first subset of the set of SIMD execution units if a duration for which one or more threads of the first thread group is idled exceeds a minimum threshold duration.

18. The non-transitory computer readable medium of claim 17, further including instructions to cause the SIMD processor to:
process the second thread group on the first subset of the set of SIMD execution units if an average duration for which multiple threads of the first thread group are idle exceeds the minimum threshold duration.

19. The non-transitory computer readable medium of claim 14, further including instructions to cause the SIMD processor to perform one or more of:
set the threshold based further on user input; and
set the threshold with scheduling logic.

20. The non-transitory computer readable medium of claim 14, further including instructions to cause the SIMD processor to determine when threads of the first thread group reach the synchronization barrier based on status information provided by the respective threads.

* * * * *